US008897268B2

(12) United States Patent
Kesselman et al.

(10) Patent No.: US 8,897,268 B2
(45) Date of Patent: Nov. 25, 2014

(54) APPARATUS AND METHOD ADAPTED FOR DIRECTIONAL BANDWIDTH RESERVATION WITH FIXED ANNOUNCEMENT SLOT IN WIRELESS NETWORKS

(75) Inventors: Alex Kesselman, San Jose, CA (US); Solomon Trainin, Haifa (IL); Yuval Bachrach, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1473 days.

(21) Appl. No.: 12/229,359

(22) Filed: Aug. 21, 2008

(65) Prior Publication Data

US 2009/0232103 A1 Sep. 17, 2009

Related U.S. Application Data

(60) Provisional application No. 61/035,480, filed on Mar. 11, 2008.

(51) Int. Cl.
*H04J 3/00* (2006.01)
*H04B 7/06* (2006.01)
*H04W 74/08* (2009.01)
*H01Q 3/26* (2006.01)

(52) U.S. Cl.
CPC .............. *H01Q 3/26* (2013.01); *H04B 7/0682* (2013.01); *H04W 74/08* (2013.01)
USPC ........................................................ 370/336

(58) Field of Classification Search
USPC .................. 370/336, 321, 329, 342
See application file for complete search history.

(56) References Cited

U.S. PATENT DOCUMENTS

| 6,115,390 | A * | 9/2000 | Chuah ........................ 370/443 |
| 6,377,548 | B1 * | 4/2002 | Chuah ........................ 370/233 |
| 6,526,281 | B1 * | 2/2003 | Gorsuch et al. ............ 455/452.1 |
| 6,640,248 | B1 * | 10/2003 | Jorgensen .................... 709/226 |
| 7,260,079 | B1 * | 8/2007 | Chapman et al. ............ 370/338 |
| 2002/0105970 | A1 | 8/2002 | Shvodian | |
| 2002/0114313 | A1 | 8/2002 | Walsh et al. | |

(Continued)

FOREIGN PATENT DOCUMENTS

| JP | 2001-285298 A | 10/2001 |
| JP | 2003-500954 A | 1/2003 |

(Continued)

OTHER PUBLICATIONS

International Preliminary Report on Patentability received for PCT Patent Application No. PCT/US2009/036740, mailed on Sep. 23, 2010, 6 pages.

(Continued)

*Primary Examiner* — Derrick W. Ferris
*Assistant Examiner* — Mohammad Anwar
(74) *Attorney, Agent, or Firm* — James S. Finn

(57) ABSTRACT

An embodiment of the present invention provides an apparatus, comprising a transceiver operable in a wireless personal area network, wherein the transceiver is configured to communicate with a coordinator and at least one receiver and wherein the transceiver and the coordinator use a directional reservation of free channel time blocks using contention-based slots, by selecting uniformly at random contention slots by the transceiver and transmitting a bandwidth reservation request message specifying the requested reservation period using directional transmission pointed towards the coordinator.

18 Claims, 3 Drawing Sheets

(56) References Cited

U.S. PATENT DOCUMENTS

| | | | |
|---|---|---|---|
| 2006/0146863 A1* | 7/2006 | Spinar et al. | 370/449 |
| 2006/0203789 A1* | 9/2006 | Iacono et al. | 370/338 |
| 2006/0209876 A1 | 9/2006 | Liu et al. | |
| 2007/0189239 A1* | 8/2007 | Lim et al. | 370/337 |
| 2007/0248072 A1 | 10/2007 | Kwon et al. | |
| 2007/0253391 A1* | 11/2007 | Shao et al. | 370/338 |
| 2007/0268862 A1 | 11/2007 | Singh et al. | |
| 2008/0026797 A1 | 1/2008 | Nanda et al. | |
| 2008/0095072 A1 | 4/2008 | Shao et al. | |
| 2008/0112368 A1* | 5/2008 | Kwon | 370/336 |
| 2008/0112370 A1* | 5/2008 | Kwon | 370/336 |
| 2008/0175199 A1* | 7/2008 | Shao et al. | 370/329 |
| 2008/0240146 A1* | 10/2008 | Singh et al. | 370/458 |
| 2009/0080366 A1* | 3/2009 | Shao et al. | 370/315 |

FOREIGN PATENT DOCUMENTS

| | | |
|---|---|---|
| TW | 200828857 A | 7/2008 |
| WO | 03/026221 A1 | 3/2003 |
| WO | 2006/049415 A1 | 5/2006 |
| WO | 2007/031959 A2 | 3/2007 |
| WO | 2008/026868 A2 | 3/2008 |
| WO | 2009/114586 A2 | 9/2009 |
| WO | 2009/114586 A3 | 12/2009 |

OTHER PUBLICATIONS

International Search Report and Written Opinion received for PCT Patent Application No. PCT/US2009/036740, Mailed on Oct. 23, 2009, pp. 11.

Office Action Received for European Patent Application No. 09719850.1, mailed on Oct. 19, 2010, 2 pages of Office Action.

Office Action Received for Korean Patent Application No. 10-2010-7020300, mailed on Oct. 24, 2011, 3 pages of Office Action and 2 pages of English Translation.

Office Action Received for Chinese Patent Application No. 200910130800.4, mailed on May 26, 2011, 3 pages of Office Action and 5 pages of English Translation.

Office Action Received for Chinese Patent Application No. 201110025130.7, mailed on Dec. 7, 2011, 3 pages of Office Action and 6 pages of English Translation.

Office Action Received for Taiwanese Patent Application No. 098107655, mailed on Feb. 20, 2014, 5 Pages of Taiwanese Office Action and 1 Page of Search report only.

Office Action Received for Chinese Patent Application No. 200910130800.4, mailed on May 4, 2012, 3 Pages of Chinese Office Acion and 4 Pages of English Translation.

Office Action Received for Japanese Patent Application No. 2010-547876, mailed on Apr. 24, 2012, 4 Pages of Japanese Office Action and 3 Pages of English Translation.

Office Action Received for Japanese Patent Application No. 2010-547876, mailed on Aug. 14, 2012, 1 Page of Japanese Office Action and 2 Pages of English Translation.

Supplemental European Search Report received for European Patent Application No. EP09719850.1 mailed on Apr. 15, 2014, 7 pages of Supplemental Search Report.

Office Action Received European Paten Application No. EP09719850.1 mailed on May 6, 2014, 1 page.

* cited by examiner

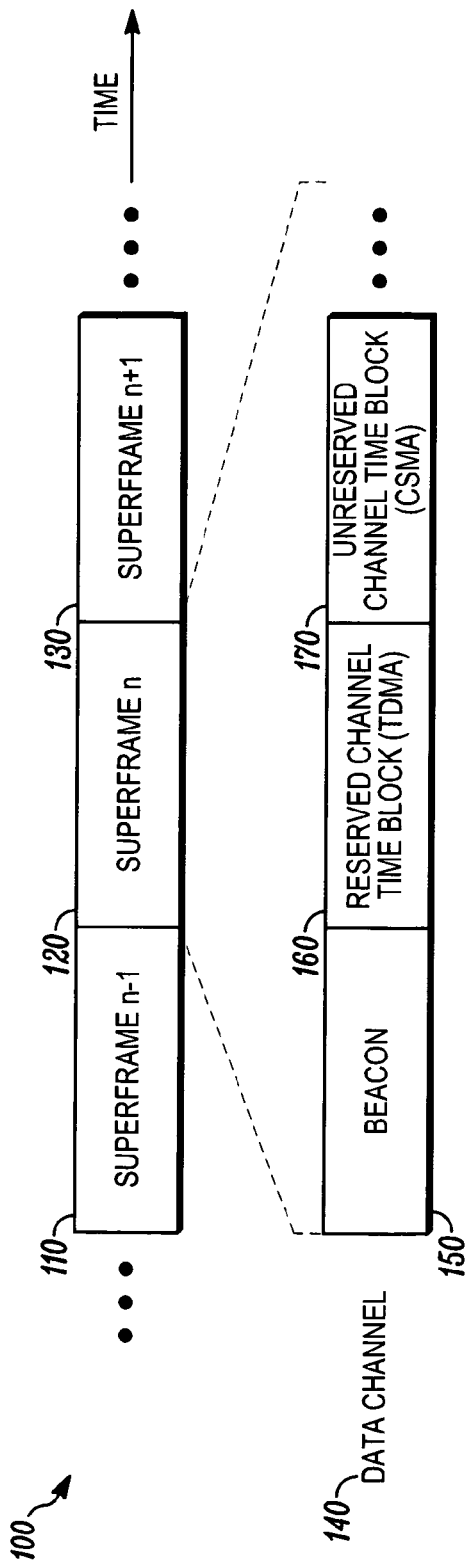
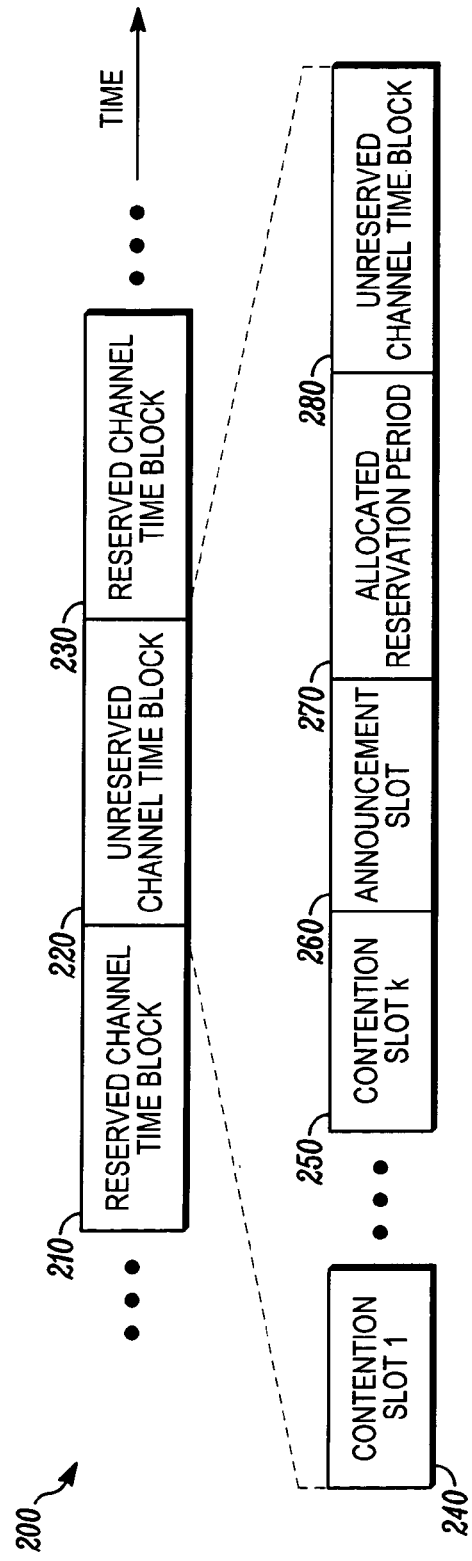

APPARATUS AND METHOD ADAPTED FOR DIRECTIONAL BANDWIDTH RESERVATION WITH FIXED ANNOUNCEMENT SLOT IN WIRELESS NETWORKS

CROSS REFERENCE TO RELATED APPLICATIONS

The present application claims priority to U.S. Provisional Patent Application Ser. No. 61/035,480, filed Mar. 11, 2008, by Li et al. entitled, "60 GHZ WPAN MAC AND PHY FEATURES".

BACKGROUND

The availability of 7 GHz of unlicensed spectrum in the 60 GHz band offers the potential for multi-Gigabit indoor wireless personal area networking (WPAN). Applications that require large bandwidth include uncompressed High Definition (HD) video streaming, fast file download from an airport kiosk (Sync & Go) and wireless display and docking, to name just a few. These applications cannot be supported over existing home networking solutions (IEEE 802.11a/b/g/n and WiMedia UWB) because the required data rates far exceed the capabilities of these networks.

Thus, a strong need exists for improvements and new development in wireless personal area networks that operate in the 60 GHz band.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 provides an example of a super-frame schedule of an embodiment of the invention;

FIG. 2 illustrates a directional bandwidth reservation mechanism of an embodiment of the present invention;

Figure 3:
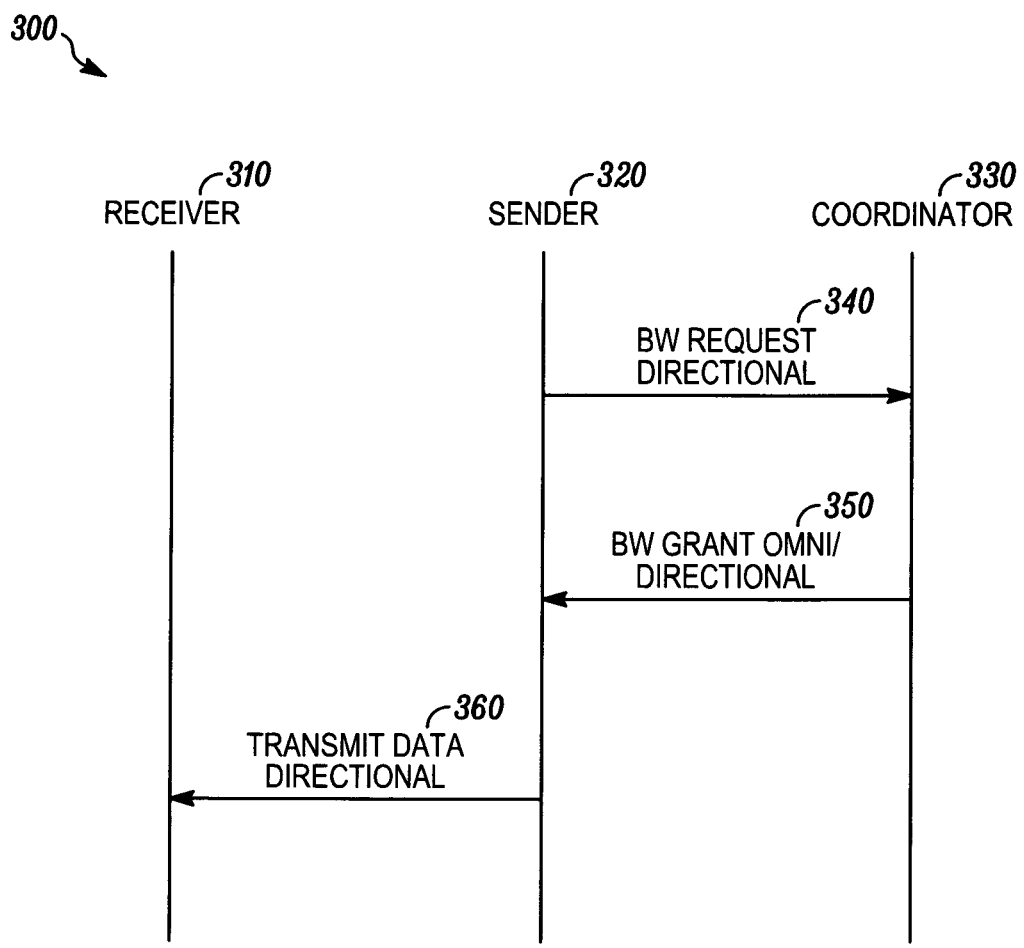
FIG. 3 illustrates a directional bandwidth reservation flow according to an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

A mmwave communication link imposes more challenges in terms of link budget than those at lower frequencies (e.g. 2.4 GHz and 5 GHz bands) because of its inherent isolation due to both oxygen absorption, which attenuates the signal over long range, and its short wavelength, which provides high attenuation through obstructions such as walls and ceilings. In many cases, it is preferable to employ directional antennas for high-speed point-to-point data transmission. Devices performing directional transmissions can achieve higher range (mitigation for the link budget issue), as well as better aggregated throughput and spatial reuse, whereas certain pairs of devices separated in space can communicate simultaneously. A directional antenna pattern covering a wide range of angles to give omni-directional coverage is usually employed to aid in neighbor discovery and beam-steering decisions. Furthermore, the antennae supported by devices can be of several types: Non-Trainable Antenna, Sectorized Antenna or Phased Array Antenna.

In a traditional 60 GHz wireless personal area networks (WPAN) the channel time is scheduled using Time Division Multiple Access (TDMA) technology that does not support parallel transmissions. Channel time reservations are usually performed for each super-frame (the basic timing division for TDMA) by the Coordinator and communicated in the beacon frame as shown in FIG. 1, generally as 100, with superframe n−1 110, superframe n 120 and superframe n+1 130. Data channel is illustrated at 140 and depicts Beacon 150, Reserved Channel Time Block (TDMA) 160 and Unreserved Channel Time Block (CSMA 170).

If a channel time block 160 is reserved for a specific pair of devices, then the sender performs high-rate directional transmissions. At the same time, if the channel time block is unreserved 170 it can be accessed using the CSMA (Carrier Sense Multiple Access) mechanism. Unfortunately, the CSMA mechanism necessitates using omni-directional transmissions that are rather inefficient and provide very low throughput. The existing medium access control (MAC) protocols allow reserving channel time blocks only starting from the next super-frame after the new schedule has been announced in the beacon. That incurs large delays for bursty data traffic, which adversely affects the application performance. On the other hand, reserving spare channel time for such traffic leads to poor channel utilization.

Embodiments of the present invention increase the bandwidth reservation efficiency by using directional transmission. The present invention further increases the throughput and decreases the latency for bursty data traffic and maintains high channel utilization when the channel is shared between bursty and isochronous connections. Embodiments of the present invention also provide efficient spatial reuse, increase the overall throughput of a WPAN and enable power saving for devices since they need to listen to the Coordinator only during the fixed announcement slot.

Looking now at FIG. 2, shown generally as 200, the present invention provides a novel mechanism for directional reservation of free channel time blocks using contention-based slots. FIG. 2 shows reserved channel time block 210, unreserved channel time block 220 and reserved channel time block 230. Expanded unreserved channel time block 220 illustrates contention slot 1 240, contention slot k 250, announcement slot 260, allocated reservation period 270, unreserved channel time block 280. At the beginning of a free time channel time block, there is a pre-defined number k of contention slots used by devices to transmit bandwidth reservation requests to the Coordinator, followed by an announcement slot used by the Coordinator to announce the granted bandwidth reservation if any. A sender that wishes to reserve an unallocated channel time block may select uniformly at random one of the contention slots and transmit a bandwidth reservation request message specifying the requested reservation period using directional transmission pointed towards the Coordinator. The contention slot duration must be long enough to accommodate this transmission. The Coordinator responds to the sender and/or other devices using directional or (quasi) omni-directional transmissions with a bandwidth grant message that specifies the transceiver (also referred to herein as a sender in an embodiment of the present invention) of links and the allocated reservation period, which can be less than or equal to the requested period. If multiple senders (or transceivers) have succeeded with request transmissions, the Coordinator selects one of them. The number k of contention slots can be either fixed (e.g. k=3) or announced by the Coordinator in the beacon frame. The Coordinator may also allow certain non-interfering links to utilize the allocated channel time block as specified in the bandwidth grant message. In this case, the bandwidth grant message must reach all the relevant devices. The message flow of an embodiment of the present invention is shown in FIG. 3 at 300. Sender 320 sends directional bandwidth request to coordinator 330 at 340 and Coordinator 330 sends BW grant (omni/directional) at 350. Sender 320 transmits data directionally to receiver 310 at 360.

Figure 4:
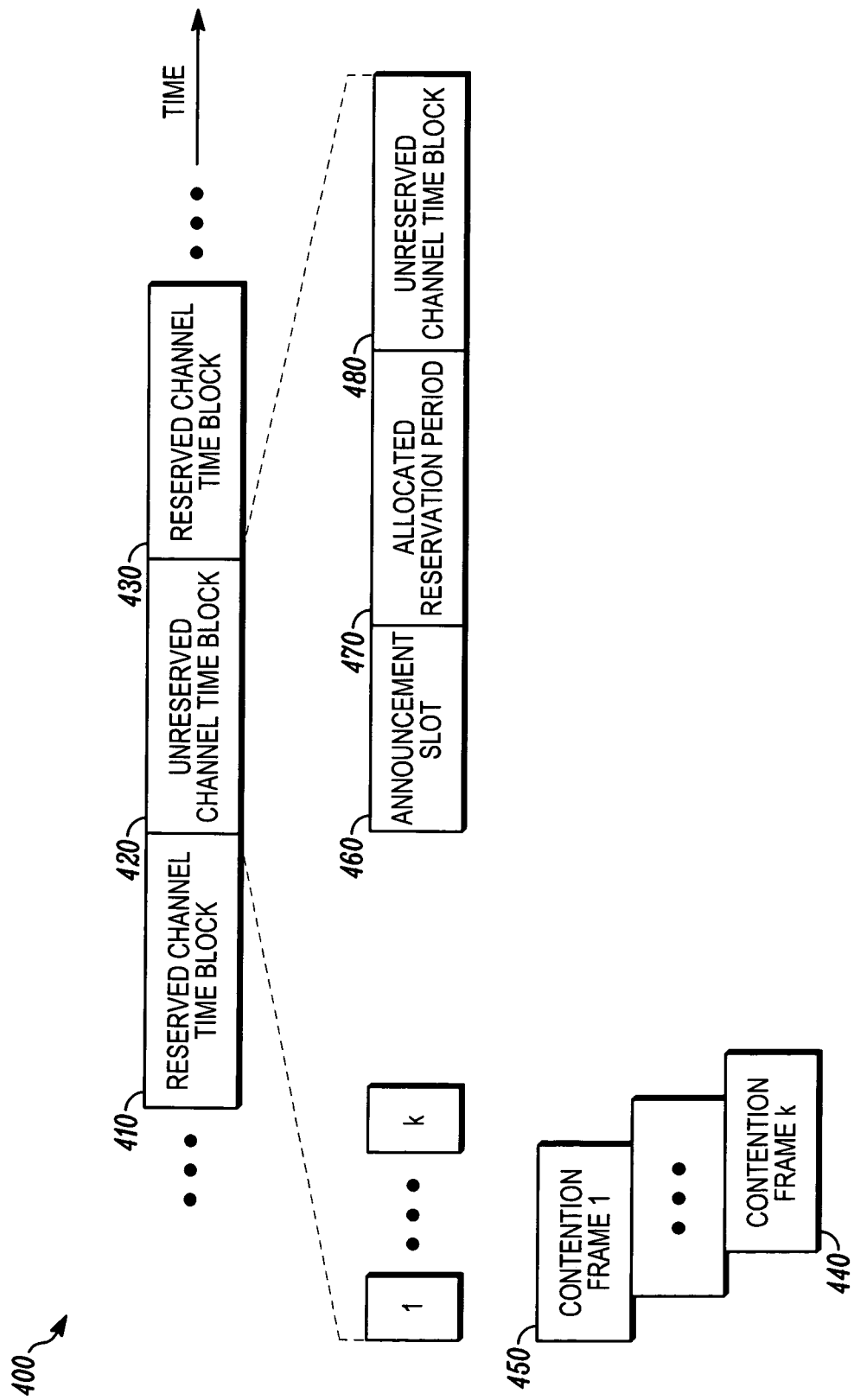
FIG. 4 illustrates a directional bandwidth reservation mechanism with beam-formed reception according to an embodiment of the present invention.

The present invention works if either beam-formed (directional) or omni-directional antenna is used by the Coordinator for reception during contention slots. However, the Coordinator's reception is susceptible to interference for an omni-directional antenna. At the same time, the bandwidth reservation mechanism may be improved for beam-formed reception. Basically, contention slots are shortened to accommodate only the transmission of a preamble allowing the Coordinator to perform antenna training and lock onto the directional signal. The preamble may be followed by directional transmission of a bandwidth reservation request message. Though the transmission of the request message may collide in time with subsequently transmitted messages, beam-formed reception maximizes the probability that the Coordinator will successfully receive the bandwidth reservation request associated with the first contention slot selected for transmission. Moreover, an additional advantage of this modification is that there is no need for the Coordinator to perform arbitration between multiple received requests since at most one sender can succeed. The modified mechanism for beam-formed reception is presented on FIG. 4 at 400 with reserved channel time block 410, unreserved channel time block 420 and reserved channel time block 430. Expanded view of unreserved channel time block 420 illustrates contention frame 1 450, contention frame k 440, announcement clot 460, allocated reservation period 470 and unreserved channel time block 480.

In embodiments of the present invention, two extensions may be added. Firstly, a bandwidth reservation request message may ask for a time period longer than the available time in the unallocated channel time block under consideration and the Coordinator may reserve to the sender the difference between the requested time and the actually allocated time in the future without a need to send an extra bandwidth reservation request. Secondly, if the number of devices in the WPAN that generate bursty traffic does not exceed the number of contention slots, then the Coordinator may associate every such device with a dedicated contention slot by making an advertisement in the beacon frame, thereby removing contention.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a transceiver operable in a wireless personal area network, wherein said transceiver is configured to communicate with a coordinator and at least one receiver;
wherein said transceiver and said coordinator use a directional reservation of free channel time blocks using contention-based slots, by selecting contention slots by said transceiver and transmitting a bandwidth reservation request message specifying the requested reservation period using directional transmission pointed towards said coordinator using a directional antenna for reception during contention slots; wherein contention slots are shortened to accommodate only a transmission of a preamble allowing the coordinator to perform antenna training and lock onto a directional signal; wherein the preamble is followed by a directional transmission of a bandwidth reservation request message; and
wherein if said coordinator advertises contention periods in a beacon, then said contention periods can be located at the beginning as well as in the middle of free channel time blocks;
wherein if multiple senders have succeeded with request transmission, said coordinator selects one of them.

2. The apparatus of claim 1, wherein at the beginning of said free time channel time block there is a pre-defined number of contention slots used by devices to transmit bandwidth reservation requests to the coordinator followed by an announcement slot used by said coordinator to announce granted bandwidth reservation if any.

3. The apparatus of claim 2, wherein said contention slot duration must be long enough to accommodate transmissions.

4. The apparatus of claim 1, wherein said coordinator responds to said transceiver and/or other devices using directional or quasi-omni-directional transmission with a bandwidth grant message that specifies links and an allocated reservation period.

5. The apparatus of claim 1, wherein the number of contention slots can be either fixed or announced by the coordinator in the beacon frame and said coordinator may also allow certain non-interfering links to utilize an allocated channel time block as specified in a bandwidth grant message.

6. The apparatus of claim 1, wherein said coordinator when using the directional antenna for reception during contention slots shortens contention slots to accommodate only the transmission of a preamble allowing the coordinator to perform antenna training and lock onto the directional signal and wherein said preamble is followed by directional transmission of a bandwidth reservation request message.

7. The apparatus of claim 1, wherein a bandwidth reservation request message may ask for a time period longer than the available time in an unallocated channel time block under consideration and said coordinator may reserve to said transceiver the difference between the requested time and the actually allocated time in the future without a need to send an extra bandwidth reservation request.

8. The apparatus of claim 7, wherein if the number of devices in said WPAN that generate bursty traffic does not exceed the number of contention slots, then said coordinator may associate every such device with a dedicated contention slot by making an advertisement in the beacon frame, thereby removing contention.

9. A method, comprising:
using a transceiver operable in a wireless personal area network to communicate with a coordinator and at least one receiver; and
shortening contention slots to accommodate only a transmission of a preamble when said coordinator uses a directional antenna for reception during contention slots, allowing the coordinator to perform antenna training and lock onto a directional signal and wherein said preamble is followed by directional transmission of a bandwidth reservation request message;
wherein said transceiver and said coordinator use a directional reservation of free channel time blocks using contention-based slots, by selecting contention slots by said transceiver and transmitting the bandwidth reservation request message specifying the requested reservation period using directional transmission pointed towards said coordinator using the directional antenna for reception during contention slots;
wherein if said coordinator advertises contention periods in a beacon, then said contention periods can be located at the beginning as well as in the middle of free channel time blocks;
wherein if multiple senders have succeeded with request transmission, said coordinator selects one of them.

10. The method of claim 9, further comprising pre-defining a number of contention slots at the beginning of said free time channel time block used by devices to transmit bandwidth reservation requests to the coordinator followed b an announcement slot used by said coordinator to announce granted bandwidth reservation if any.

11. The method of claim 10, further comprising requiring said contention slot duration to be long enough to accommodate transmissions.

12. The method of claim 9, further comprising responding by said coordinator to said transceiver and/or other devices using directional or quasi-omni-directional transmission with a bandwidth grant message that specifies links and an allocated reservation period, which can be less than or equal to a requested period.

13. The method of claim 9, wherein the number of contention slots can be either fixed or announced by the coordinator in the beacon flame and said coordinator may also allow certain non-interfering links to utilize an allocated channel time block as specified in a bandwidth grant message.

14. The method of claim 9, asking for a time period longer than the available time in an unallocated channel time block under consideration by a bandwidth reservation request message and reserving by said coordinator to said transceiver the difference between the requested time and the actually allocated time in the future without a need to send an extra bandwidth reservation request.

15. The method of claim 14, further comprising associating by said coordinator every device with a dedicated contention slot b making an advertisement in the beacon frame, thereby removing contention if the number of devices in said WPAN that generate bursty traffic does not exceed the number of contention slots.

16. A non-transitory machine-accessible medium that provides instructions, which when accessed cause a processor to perform operation:
configuring a transceiver operable in a wireless personal area network to communicate with a coordinator and at least one receiver;
configuring said transceiver and said coordinator to use a directional reservation of free channel time blocks using contention-based slots, by selecting contention slots by said transceiver and transmitting a bandwidth reservation request message specifying the requested reservation period using directional transmission pointed towards said coordinator using a directional antenna for reception during contention slots; and
shortening contention slots to accommodate only a transmission of a preamble when said coordinator uses a directional antenna for reception during contention slots, allowing the coordinator to perform antenna training and lock onto a directional signal and wherein said preamble is followed by directional transmission of a bandwidth reservation request message;
wherein if said coordinator advertises contention periods in a beacon, then said contention periods can be located at the beginning, as well as in the middle of free channel time blocks.

17. The non-transitory machine-accessible medium of claim 16, further comprising said instructions causing said machine to perform operations further comprising pre-defining a number of contention slots at the beginning of said free time channel time block used by devices to transmit bandwidth reservation requests to the coordinator followed by an announcement slot used by said coordinator to announce the granted bandwidth reservation if any.

18. The non-transitory machine-accessible medium of claim 16, further comprising said instructions causing said machine to perform operations further comprising requiring said contention slot duration to be long enough to accommodate transmissions.

* * * * *